(12) United States Patent
Rembe et al.

(10) Patent No.: US 11,333,741 B2
(45) Date of Patent: *May 17, 2022

(54) OPTICAL SYSTEM AND LIDAR DEVICE INCLUDING SUCH A SYSTEM

(71) Applicant: Robert Bosch GmbH, Stuttgart (DE)

(72) Inventors: Christian Rembe, Clausthal-Zellerfeld (DE); Juergen Hasselbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 440 days.

This patent is subject to a terminal disclaimer.

(21) Appl. No.: 16/570,443

(22) Filed: Sep. 13, 2019

(65) Prior Publication Data

US 2020/0096609 A1 Mar. 26, 2020

(30) Foreign Application Priority Data

Sep. 24, 2018 (DE) .......................... 102018216201.8

(51) Int. Cl.
| | |
|---|---|
| *G01S 7/481* | (2006.01) |
| *G02B 3/00* | (2006.01) |
| *G02B 5/32* | (2006.01) |
| *G01C 3/00* | (2006.01) |
| *G01S 17/08* | (2006.01) |
| *G01S 17/88* | (2006.01) |

(52) U.S. Cl.
CPC ................ *G01S 7/481* (2013.01); *G01C 3/00* (2013.01); *G01S 17/08* (2013.01); *G01S 17/88* (2013.01); *G02B 3/0056* (2013.01); *G02B 5/32* (2013.01)

(58) Field of Classification Search
CPC .......... G01S 7/481; G01S 17/08; G01S 17/88; G01S 7/4814; G01S 7/4817; G02B 5/32; G02B 26/10; G01B 3/0056; G01C 3/00
USPC ....................................................... 356/4.01
See application file for complete search history.

(56) References Cited

U.S. PATENT DOCUMENTS

2020/0379091 A1* 12/2020 Hasselbach .......... G02B 3/0056

FOREIGN PATENT DOCUMENTS

DE 102015217908 A1 3/2017

* cited by examiner

*Primary Examiner* — Daniel L Murphy
(74) *Attorney, Agent, or Firm* — Norton Rose Fulbright US LLP; Gerard Messina

(57) ABSTRACT

An optical system is described, in particular for a LIDAR device, encompassing a lens and an objective for deflecting beams out of a scanning area or into the scanning area, the lens being designed as a lens array and the objective being situated in the beam path between the scanning area and the lens, the optical system encompassing at least one optical element situated ahead of the lens in the radiation direction or connected to the lens for adjusting an incidence direction of the radiation onto the lens array. Moreover, a LIDAR device is described.

10 Claims, 9 Drawing Sheets

OPTICAL SYSTEM AND LIDAR DEVICE INCLUDING SUCH A SYSTEM

CROSS REFERENCE

The present application claims the benefit under 35 U.S.C. § 119 of German Patent Application No. DE 102018216201.8 filed on Sep. 24, 2018, which is expressly incorporated herein by reference in its entirety.

FIELD

The present invention relates to an optical system, in particular for a LIDAR device, encompassing a lens and an objective for deflecting beams out of a scanning area or into the scanning area, the lens being designed as a lens array and the objective being situated in the beam path between the scanning area and the lens. Moreover, the present invention relates to a LIDAR device.

BACKGROUND INFORMATION

LIDAR devices designed as laser scanner systems are available in the related art. Such systems often generate a beam expansion on the transmission side by utilizing microoptical elements. This takes place without an angle loss of the visual field or the scanning area. This beam expansion is utilized, on the one hand, for enhancing the system robustness with respect to local soiling of the transmitting and/or receiving objective and, on the other hand, the beam expansion is utilized for enhancing eye safety and the possibility for emitting more light power. As a result, the signal-to-noise ratio and, thereby, the range of the LIDAR device may be increased. Such a LIDAR device is described, for example, in German Patent Application No. DE 10 2015 217 908 A1.

A problem associated with such LIDAR devices, however, is the fact that different sized areas of the transmission signal are deflected directly into the aperture of the transceiver lens during the transmission-side scanning on µlens elements off the optical axis depending on the configuration of the expanded transmission beam diameter and depending on the distance of an impacted µlens element from the optical axis. Therefore, these "cut-off" portions no longer enter the scanning area, whereby, depending on the scanning angle, different sized gaps or shadows between adjacent spots may arise at the target distance of the measuring range.

SUMMARY

An object underlying the present invention may be considered that of providing a LIDAR device and an optical system, which may utilize a complete field angle of an objective for scanning the scanning area without a spot cut-off.

This object may be achieved with the aid of the present invention. Advantageous example embodiments of the present invention are described herein.

According to one aspect of the present invention, an optical system, in particular for a LIDAR device, is provided. The system encompasses a lens and an objective for deflecting beams out of a scanning area or into the scanning area. The lens is preferably designed as a lens array. The objective is situated in the beam path between the scanning area and the lens, the optical system encompassing at least one optical element situated ahead of the lens in the radiation direction or connected to the lens for adjusting an incidence direction of the radiation onto the lens array.

According to a further aspect of the present invention, a LIDAR device is provided for generating beams and for scanning a scanning area with the aid of the beams. The LIDAR device encompasses a transmitting unit for generating beams and for deflecting the beams along the scanning area and a receiver unit encompassing at least one detector for receiving reflected beams. The transmitting unit and/or the receiver unit encompass/encompasses an optical system according to the present invention.

The objective may be made up of one lens or multiple lenses. In addition, the objective may encompass an aperture, which is integrated into or is situated on the objective, for delimiting a maximum exit surface. The lens array may be, in particular, a µlens array.

Due to the utilization of the optical element, the beams may be affected in such a way that a so-called spot cut-off of the beams no longer occurs at the edge area of the objective.

This optical function may be implemented, for example, with the aid of a wedge structure on a back side or ahead of the back side of the utilized lens array. Alternatively or additionally, the optical function may be implemented with the aid of an optical grid or a diffractive optical element or also a holographic optical element.

By utilizing a lens array including an additionally downstream-positioned or integrated wedge array, an edge area of the transmission spot may be deflected by an appropriate wedge angle or an optical grid, where the aperture of the objective is no longer irradiated by the spot. The spot is deflected in such a way that it may still pass through the light-permeable area of the objective. Directly after the objective has been passed through, the spot areas affected and unaffected by the optical element may superpose themselves. These spot areas precisely form the desired beam diameter at the target distance of the area or of the scanning area to be detected. As a result, the full field angle of the objective may be utilized for scanning the scanning area without a transmission-side spot cut-off. In particular, as a result, a more efficient utilization of the transmission power may be implemented. Alternatively or additionally, the transmission spots may also be deflected out of the objective, at an angle, offset with respect to an optical axis. As a result, the desired spot position may be reached again at an intended target distance, a superposition of the beams being simultaneously avoided.

The optical system may be utilized in a LIDAR device preferably on the transmission side and/or on the receive side.

According to a specific embodiment, the optical element is designed as a diffractive or holographic optical element, which is mounted, at least on one side, onto the lens or is situated in the beam path of the beams, spaced apart from the lens. With respect to the approach described in the following point, it is also possible to implement this optical function with the aid of a diffractive optical system in order to prevent a spot cut-off on the transmission side as well as on the receive side. Instead of a wedge array, an optical grid array is possible, which deflects the transmission beam or the receive beam at the desired angle.

According to a further exemplary embodiment, the optical element is designed as a wedge array having at least one surface positioned obliquely with respect to the radiation direction. The lens array including the wedge array may deflect the light portion of the areas previously cut off by the aperture and incident on the objective at another angle in an axially parallel manner in the direction of the detector of the LIDAR device. Here, only a portion of the signal radiating through a lens element of the lens array or the entire spot or beams may be deflected at an angle in such a way that it does not impact the objective aperture. As a result, typical µlenses may be utilized, so that custom-made elements may be dispensed with.

According to a further exemplary embodiment, the optical element is spaced apart from the lens. As a result, the effect of the optical element on the radiation, in addition to the design of the wedge-shaped sections or surfaces, may be additionally adapted by way of the distance to the lens. In particular, a separate optical element may be designed as a retrofit approach and may be subsequently installable in already operating LIDAR devices.

According to a further exemplary embodiment, the optical element is connected to the lens in integrally or materially joined fashion. In particular, the wedge array may be mounted on a back side of the lens array, so that the usually planar surface of the lens array is designed as a wedge array. Therefore, a compact array equipped on both sides with optical functions may be provided, which is optimally adaptable to a field angle of the objective.

According to a further specific embodiment, the at least one surface of the wedge array is formed rotation-symmetrically along an axis of symmetry. Preferably, the wedge array may have a shape, which is adapted to a shape of the objective or to an opening shape of the aperture. A rotation-symmetrical shape of the wedge array may be manufactured, for example, in a technically particularly easy way.

According to a further specific embodiment, the optical element designed as a wedge array includes at least two surfaces pitched at an angle in relation to the axis of symmetry. A pitch of the surfaces decreases as the distance from the axis of symmetry increases. The obliquely pitched surfaces of the wedge array may therefore have a setting, which may depend on the radial distance and on the arrangement of the objective. The signal or the beams is/are deflected onto the objective on the transmission side with the aid of an angular difference, whereby the signal or the beams impacts/impact the objective at another position and, therefore, do not impact the aperture. The angular difference is selected in such a way that the beams or the transmission signal illuminate/illuminates the same object point at the target distance of the detection space.

Therefore, it is also possible for the optical system to capture the light reflected back by the illuminated object point at the same angle in its entirety again without a spot cut-off and to deflect it in an axially parallel manner downstream from the wedge array in the direction of the detector. The wedge array may be designed as a µwedge array.

According to a further specific embodiment, a radial distance between the at least two surfaces increases as the distance of the surfaces from the axis of symmetry increases. The height of the particular wedge structures or wedge surfaces may correspond to the utilized pitch of the µlenses. In particular, the height may be designed to be constant or variable depending on the design of the optical system. Due to the incidence angle of the signal, which becomes steeper depending on the distance from the optical axis, the wedge angles must be adapted accordingly. As the distance from the optical axis increases, the distance between the wedges or the surfaces themselves also increases. Advantageously, the entire structure may be designed radially symmetrically with respect to the optical axis or with respect to the axis of symmetry.

According to a further specific embodiment, the at least one surface of the wedge array is oriented radially away from the axis of symmetry and from the lens. As a result, the wedge array may be oriented directly onto the incoming beams. The incoming beams may be the beams generated by the transmitting unit or the beams reflected in the scanning area or reflected-back beams.

Such an optical system may be utilized, for example, in automotive LIDAR devices, in the consumer sector, in the construction sector, in the field of craftsmen, in trains, in drones or aircrafts, in industry, such as automation engineering, in a production environment, and the like.

Preferred exemplary embodiments of the present invention are explained in greater detail in the following with reference to highly simplified schematic representations.

DETAILED DESCRIPTION OF EXAMPLE EMBODIMENTS

Figure 1:
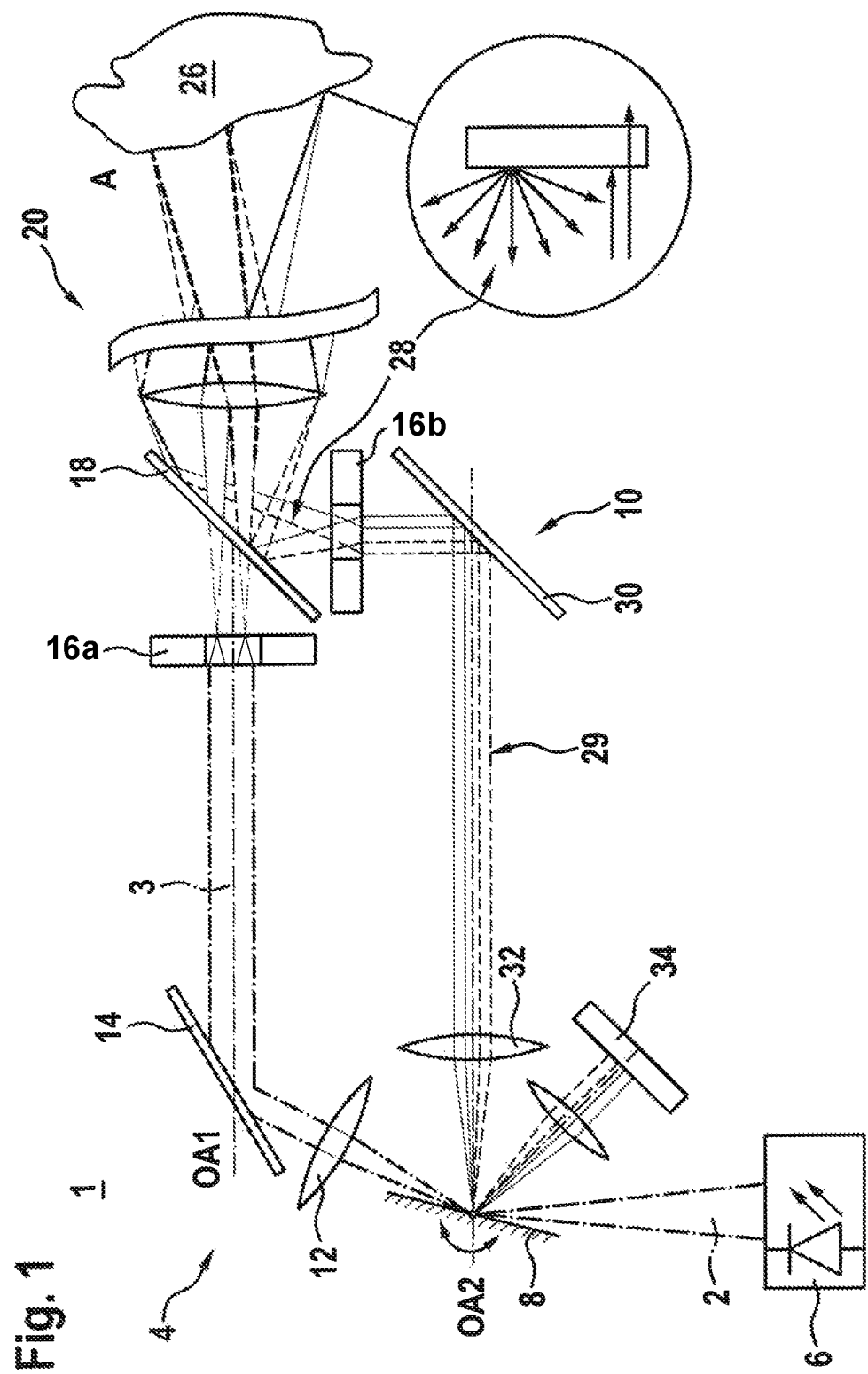
FIG. 1 shows a schematic representation of a LIDAR device according to an exemplary embodiment.

In FIG. 1, a schematic representation of a LIDAR device 1 according to an exemplary embodiment is shown. LIDAR device 1 is utilized for generating beams 2 and for scanning a scanning area A with the aid of beams 2. Device 1 encompasses a transmitting unit 4 including a laser 6 as the radiation source for generating beams 2.

Generated beams 2 are successively deflected with the aid of a movable mirror 8 of transmitting unit 4. Movable mirror 8 may be designed as a pivotable µmirror and oscillates periodically, whereby scanning area A is scanned. Mirror 8 is utilized by transmitting unit 4 together with receiver unit 10.

Beams 2 deflected by mirror 8 are bundled or made preferably parallel with the aid of a collimator lens 12 and are deflected by a deflection mirror 14 transversely to the beam direction of laser 6. Deflected beams 3 are emitted along a first optical axis OA1 onto a lens 16a.

Lens 16a is designed as a µlens array and is described in greater detail in the following. Lens 16a acts on beams 3 before beams 3 are deflected onto a beam splitter 18 and onto an optical transmission system 20. Optical transmission system 20 is utilized for emitting beam 3 into scanning area A.

According to the exemplary embodiment, optical transmission system 20 is designed as a combined transceiver optics 20 and is also utilized by receiver unit 10. Transceiver optics 20 encompasses an objective 22 and an aperture 24.

In scanning area A, beams 28 reflected back or reflected, for example, on an object 26, are received by transceiver optics 20 and are deflected via beam splitter 18 onto a lens 16b of receiver unit 10. Lens 16b of receiver unit 10 and of transmitting unit 4 may be designed identically or differently.

After passing lens 16b, beams 28 are deflected onto a deflection mirror 30. The deflected beams are deflected by deflection mirror 30 onto a second optical axis OA2, where second optical axis OA2 may extend in parallel to first optical axis OA1. Deflected beams 29 are deflected, again, onto a detector 34 with the aid of a focusing lens 32 and with the aid of swivelable mirror 8.

Transmission beams 2, 3 are scanned with the aid of transmission-side µlens array 16 due to the movement of mirror 8 and its alternating movement. With the aid of each µlens element 17, a divergent transmission beam is then projected onto transceiver optics 20 before the transmission beam, having been expanded, may exit LIDAR device 1 into scanning area A. After reflection/scattering on an object 26 located in field A, signal 28 passes through transceiver optics 20 again and is deflected via the above-described optical elements onto detector 34.

Figure 2A:
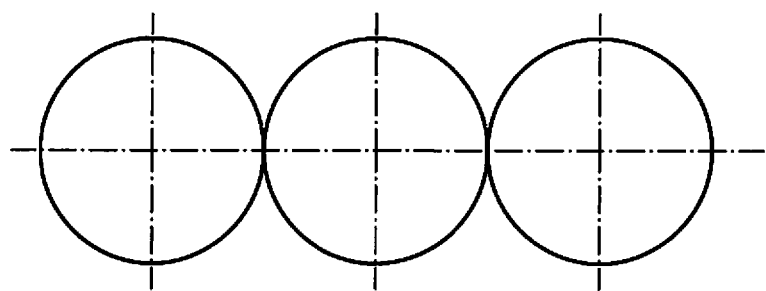
FIGS. 2A and 2B show schematic representations of setpoint and actual transmission spot arrangements in a target distance in the scanning area.
Figure 2B:
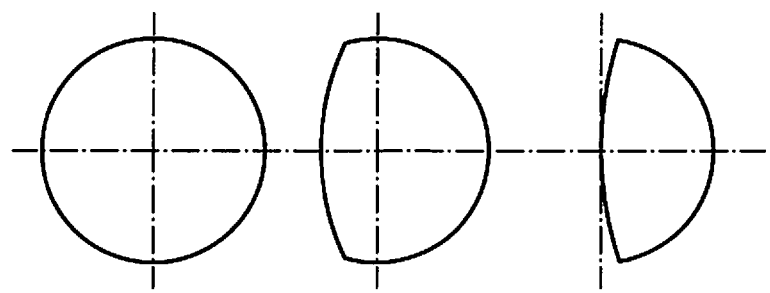

FIGS. 2A and 2B illustrate, in schematic representations, a setpoint transmission spot arrangement and an actual transmission spot arrangement at a target distance in scanning area A for illustrating the problem associated with the related art. FIG. 2A shows three different setpoint spot arrangements. The true actual spot arrangements represented in FIG. 2A are represented in FIG. 2B. An inherent problem of typical scanner systems is the fact that different sized areas of the transmission signal are deflected directly into aperture 24 of the transceiver lens during the transmission-side scanning on µlens elements off the optical axis, depending on the configuration of the expanded transmission beam diameter and on the distance of an impacted µlens element from the optical axis. This is illustrated in detail in FIG. 3. Therefore, these "cut-off" portions 36 no longer enter the field or objective 22 of transceiver optics 20, where different sized gaps between adjacent spots arise at the target distance of the measuring range depending on the scanning angle of mirror 8. The spots which have been "cut-off" on a left side are represented in FIG. 2B.

This means that the full field angle of utilized objective 22 may never be used without generating a spot cut-off 36 having a size of up to half the original diameter.

Depending on the diameter of expanded transmission beam 3, transmission beam 3 is cut off at a certain µlens height with respect to optical axis OA1 through aperture 24 of transceiver optics 20. The distance of µlens element 17 to optical axis OA1 is converted into a deflection angle in the field (field angle, FoV). The greater the transmission beam diameter, the smaller the field angle is, at which the full diameter of transmission spot 3 is already cut.

Figure 3:
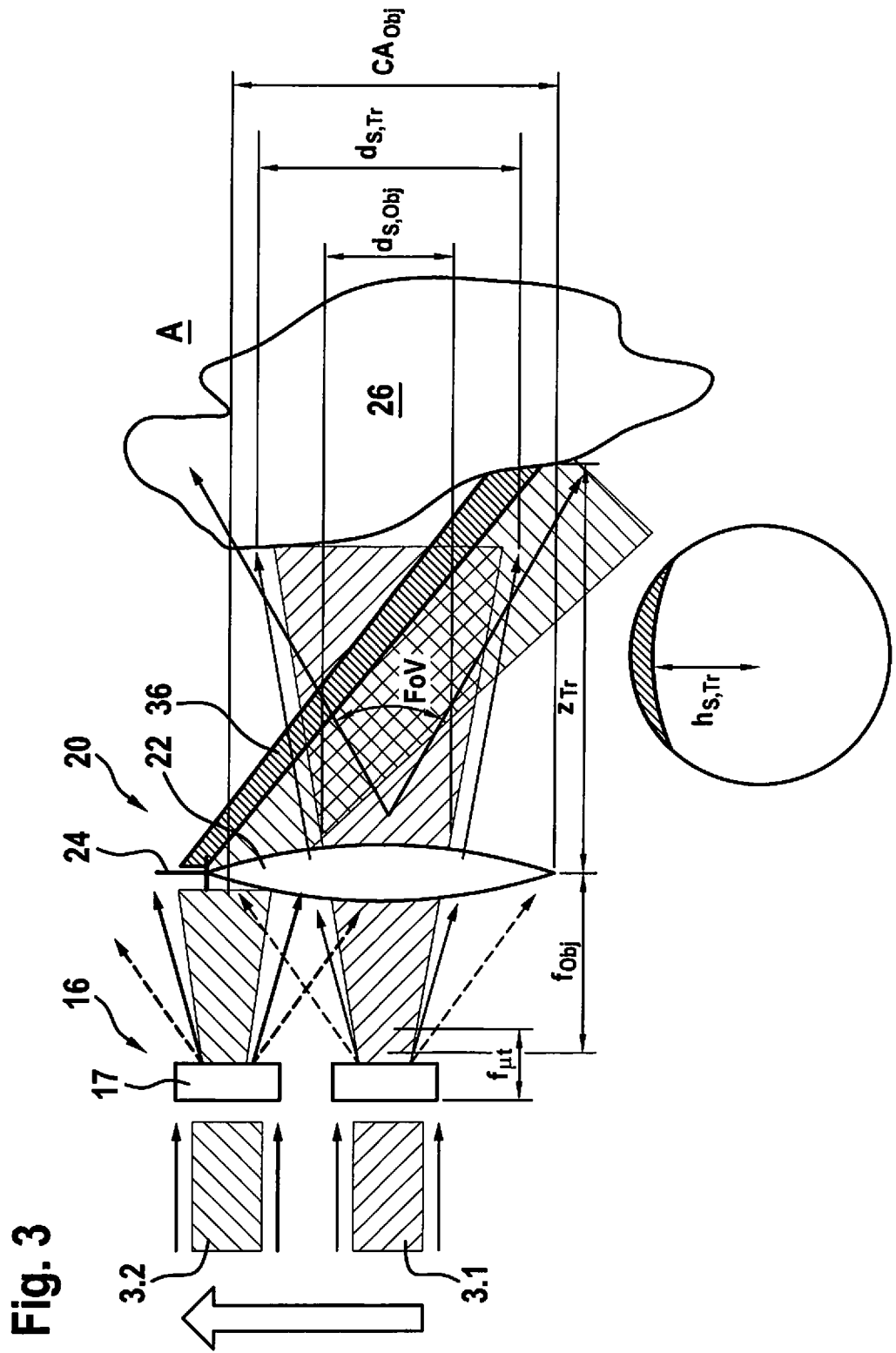
FIG. 3 shows a schematic partial representation of a transmitting unit including a corresponding spot.

In FIG. 3, two beams 3.1, 3.2 and the corresponding beam paths are represented, by way of example, each of which may arise at different angles of mirror 8.

On the transmission side, portions 36 of beams 3 impacting aperture 24 are not emitted into scanning area A. On the receive side, these areas may not be received or deflected axially parallel to detector 34 even in the case of possible previous illumination. Therefore, the system is not sensitive in this area.

Figure 4:
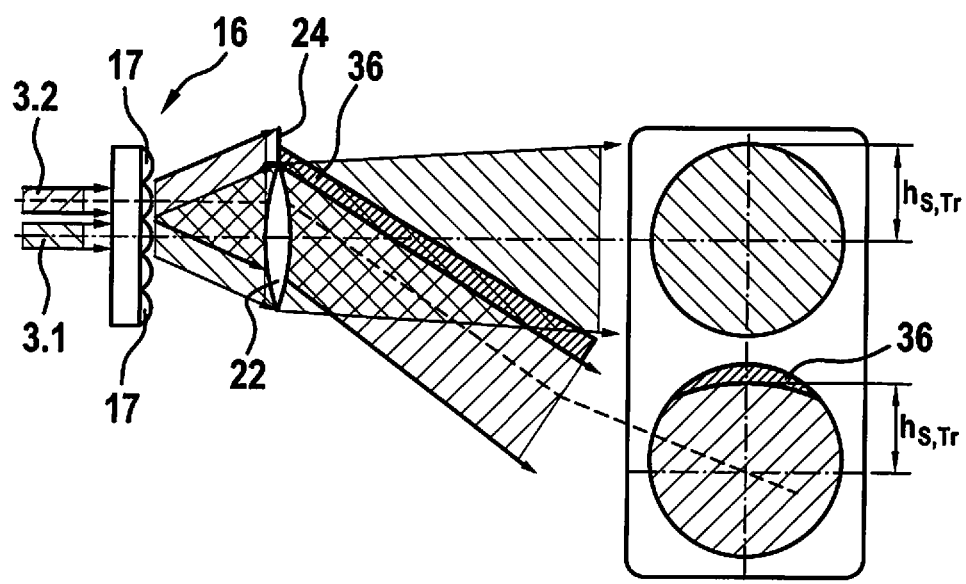
FIGS. 4 through 7 show exemplary comparisons of optical systems with and without an optical element.
Figure 5:
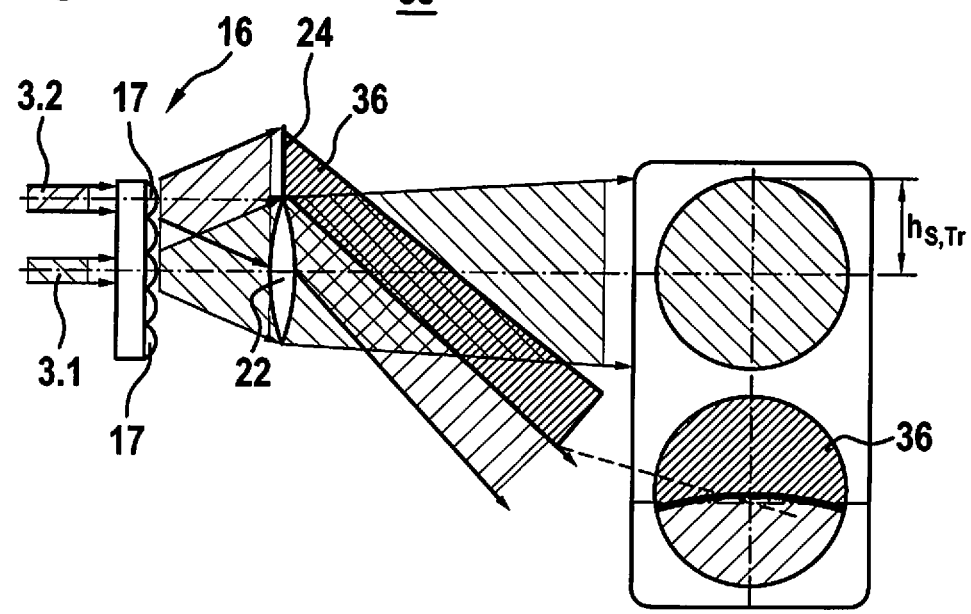

In FIGS. 4 through 7, exemplary comparisons of optical systems 38 with and without optical elements 40 are represented. FIGS. 4 and 5 show two scan settings of a mirror 8 including the use of a lens 16, which is a µlens array, without an additional optical element 40. The greater the distance of illuminated lens 16, which is a µlens array, to optical axis OA1, the larger areas 36 of spot 3 cut off by aperture 24—which are to represent the spot cut-off—become. As a result, the larger spot cut-off 36 is, the smaller the remaining illuminated area is in scanning area A or the larger the gaps are between the adjacent spots at different positions of mirror 8. The height of the spot in radial direction $h_S$, $T_r$, may therefore be reduced on one side by spot cut-off 36.

Figure 6:
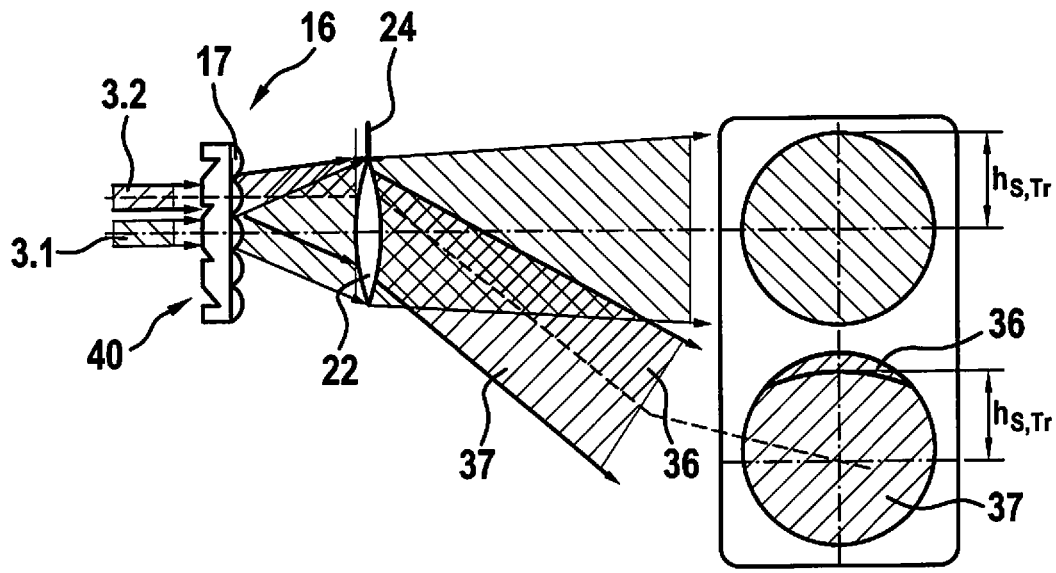
Figure 7:
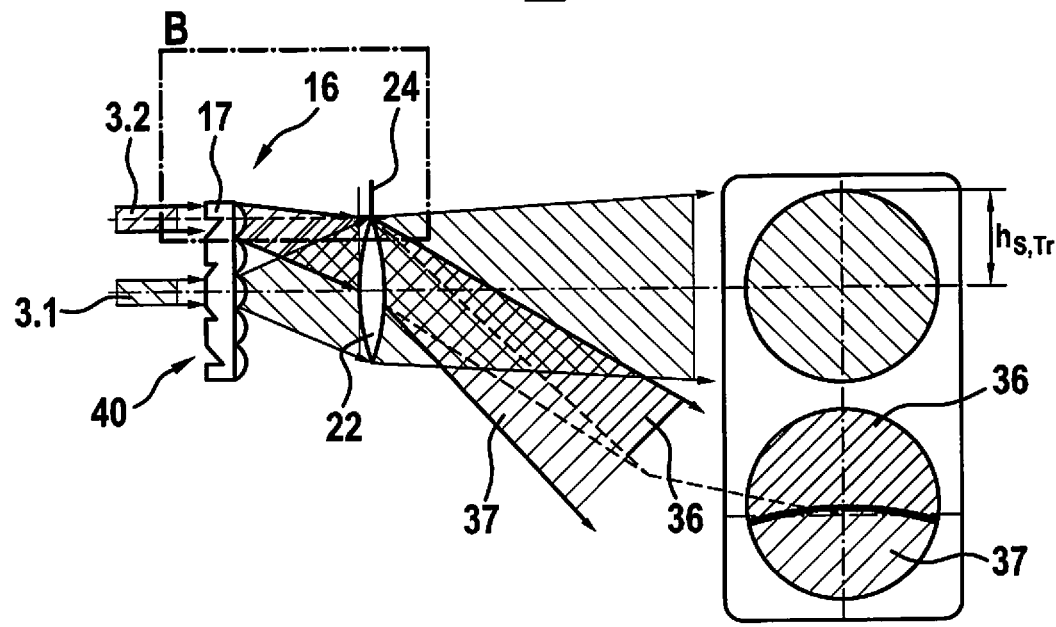

In FIGS. 6 and 7, the identical scan settings as in FIGS. 4 and 5 are illustrated, although with the use of a µlens array 16, which is equipped with additional optical element 40. According to the exemplary embodiment, optical element 40 is designed as a wedge array and is integrated on a back side of µlens array 16.

It is illustrated here how spot cut-off 36 is deflected by an appropriate wedge angle and no longer radiates directly into aperture 24 of objective 22. Spot 3 is deflected in such a way that it may still pass through the light-permeable area of objective 22. Directly downstream from objective 22, the two spot areas 37 superpose themselves but precisely reflect the desired beam diameter again at the target distance of the area to be detected. As a result, the full field angle of objective 22 may be utilized for scanning detection area A, without transmission-side spot cut-off 36.

On the receive side, areas 36 blocked by aperture 24 are also not light-sensitive for the system shown by way of example. This means, when the signal from these areas would fall back onto objective 22, the signal could not be deflected in an axially parallel manner in the direction of detector 34. This signal portion would therefore get lost in the system, where an object 26 may not be perceived in these areas. With the aid of lens 16, which is a µlens array, including an optical element 40, which is a wedge array, shown in FIGS. 6 and 8, the light portion of areas 36 previously cut off by aperture 24 may fall on objective 22 at another angle and be deflected in an axially parallel manner in the direction of detector 34.

Figure 8:
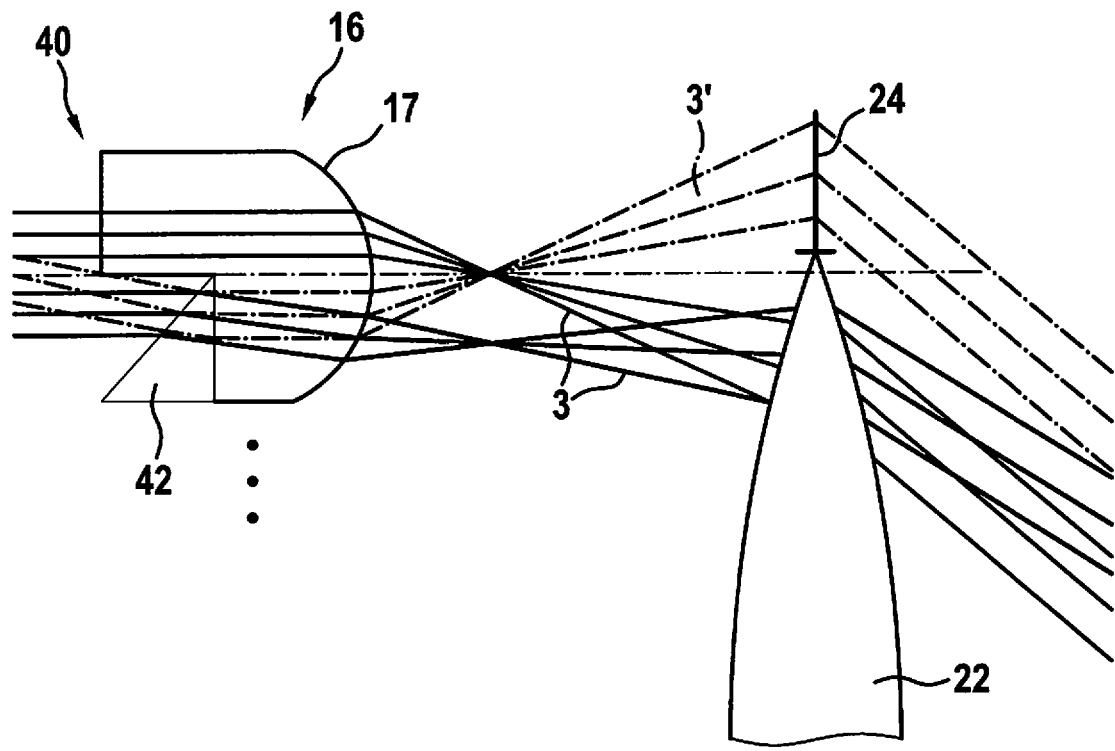
FIG. 8 shows a detail B from FIG. 7 for illustrating an optical function of the optical system.

FIG. 8 shows a section B from FIG. 7 for illustrating an optical function of optical system 38 with and without the optical element 40, which is a wedge array. The beam path on the transmission side and on the receive side are represented by µlens element 17 and downstream objective 22. In particular, beam paths are represented by comparison of beams 3' without an optical element 40 and of beams 3 including an optical element 40.

Beam bundle 3 through the upper half of µlens element 17 is identical on the transmission side and the receive side, since it may not be limited by objective aperture 24.

Transmission beam 3' directed through the lower half of µlens element 17, however, would be deflected on the transmission side directly into aperture 24 without an appropriate wedge element or surface 42 of optical element 40.

If an appropriate wedge element 42 is now contained or installed upstream in µlens element 17, beam bundle 3' may be deflected to a greater extent on the transmission side. As a result, this portion still passes through the optically permeable portion of objective lens 22. Shortly downstream from objective 22, these two portions still superpose themselves, although they form a circular spot having the previously specified diameter at the target distance of the measuring range.

Figure 9:
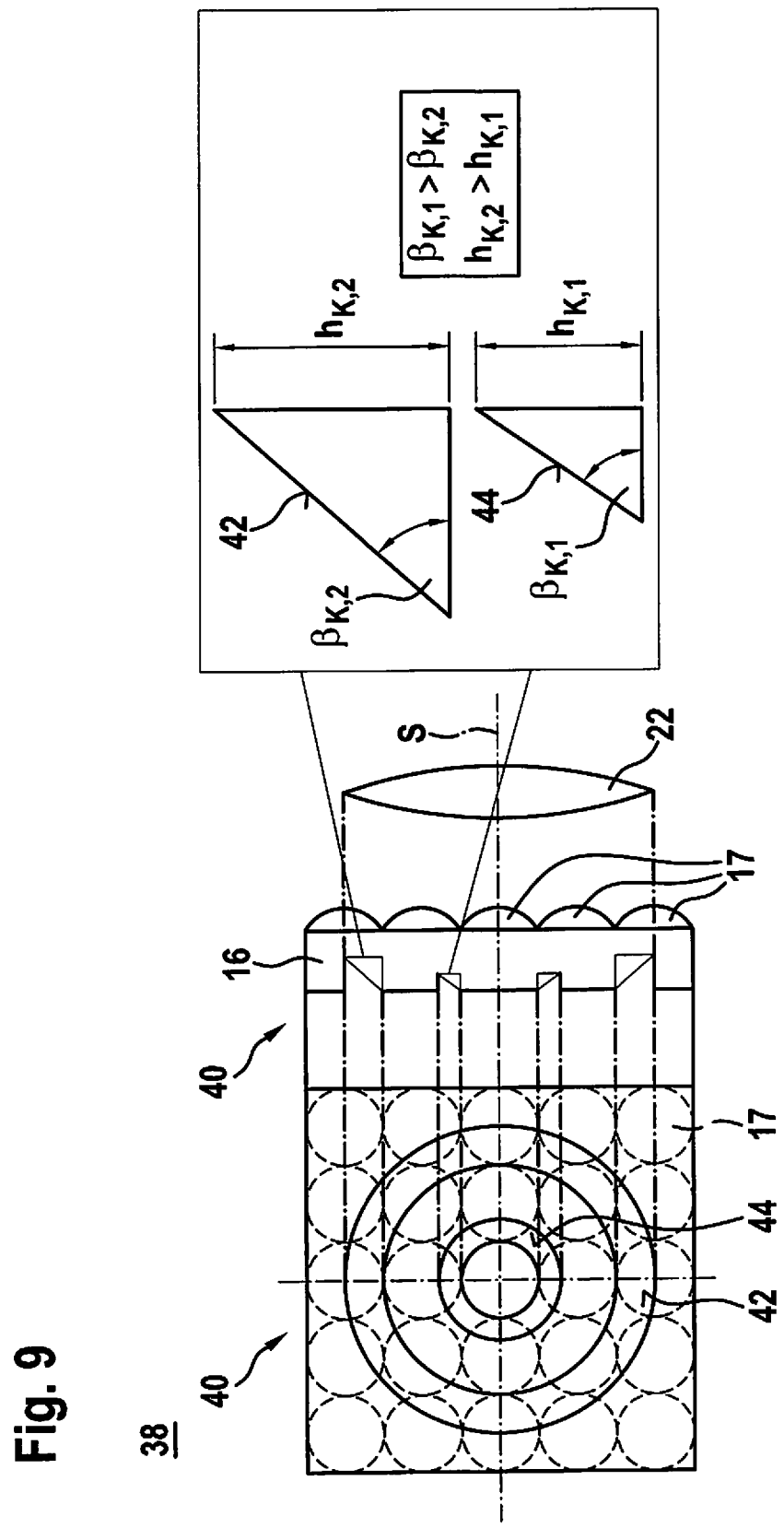
FIG. 9 shows a schematic representation of an optical element integrated into a lens.

FIG. 9 shows a schematic representation of an optical system 38 including an optical element 40 integrated into a lens 16. In particular, the geometry of the necessary wedge elements or surfaces 42, 44 of the optical element 40, which is a wedge array, are shown.

According to the exemplary embodiment, optical element 40 designed as a wedge array includes two obliquely pitched surfaces 42, 44, which are shaped rotationally symmetrically along an axis of symmetry S. Surfaces 42, 44 are formed on a surface of lens 16 positioned opposite μlens elements 17, where an integral unit made up of μlens array and the optical element wedge array 40, which is a wedge array, is created. According to the exemplary embodiment, axis of symmetry S is also an axis of symmetry of objective 22 and is congruent with first optical axis OA1.

In this case, in particular, the following interrelationships arise:

The greater the distance of μlens element 17 to optical axis OA1, S, the greater the edge length or height $h_K$ of wedge element 42, 44 must be, since beam cut-off 36 also increases as the distance to the optical axis increases.

The greater the distance of μlens element 17 to optical axis OA1, S, the smaller angle $β_K$ of particular wedge element 42, 44 must be, since the angle of beam bundle 3 falling in on the receive side with respect to the entry surface of the objective also decreases as the distance to optical axis OA1, S increases.

Therefore, a wedge element 42, 44 which is individual in terms of wedge element height $h_K$ and wedge angle $β_K$ may be situated for each distance height of a μlens element with respect to the optical axis.

Figure 10:
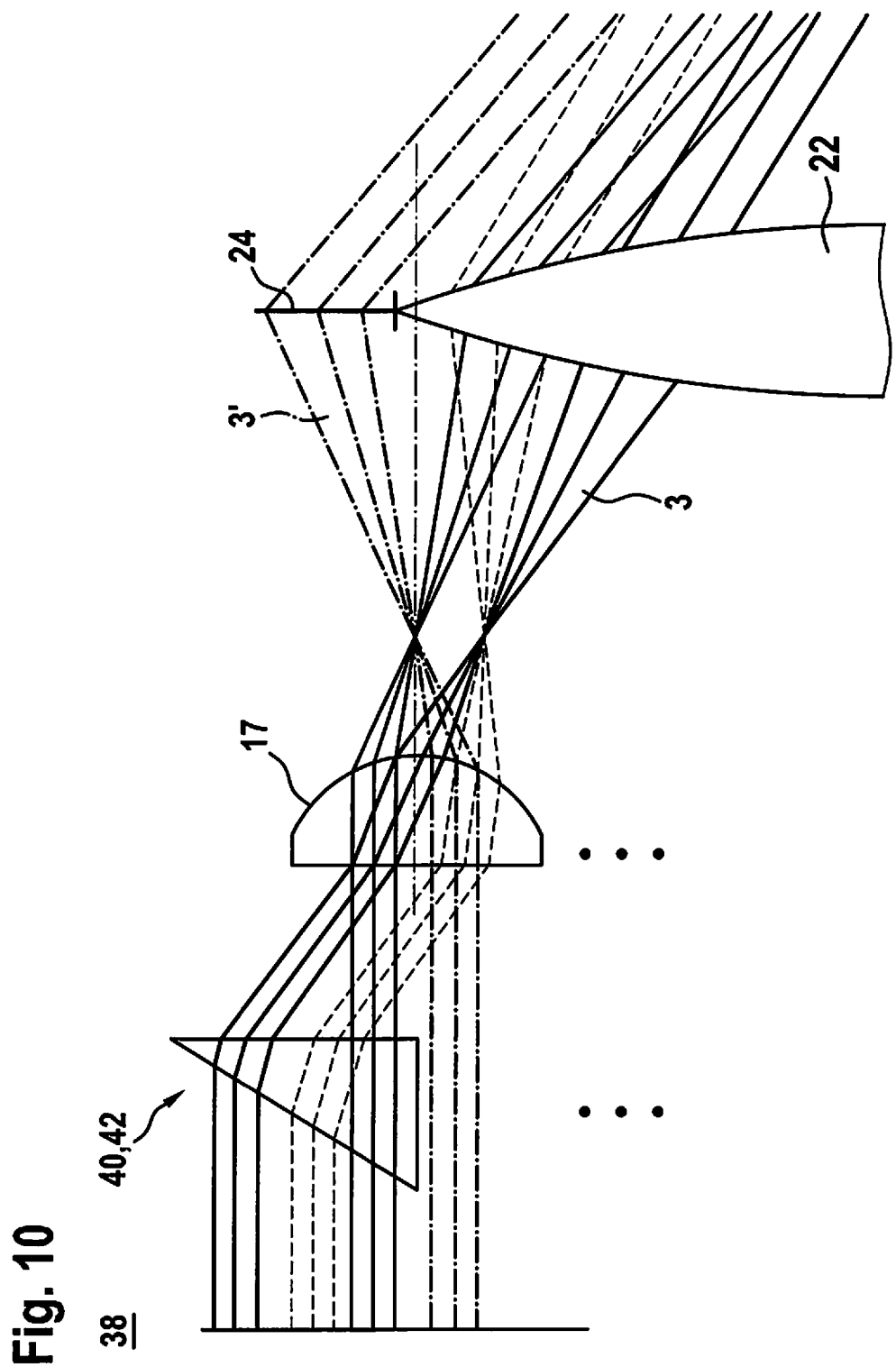
FIG. 10 shows a detailed view of an optical system.

In FIG. 10, a detailed view of an optical system 38 according to a further exemplary embodiment is represented. In this case, optical element 40 designed as a wedge array is not integrated into lens 16, but rather is spaced apart from lens 16.

Not only a portion of signal 3, but rather entire signal 3, falling through a μlens element 17 is deflected at an angle in such a way that it does not impact objective aperture 24.

Signal 3' is deflected on the transmission side by wedge element 42 with the aid of an angular difference onto objective 22, where signal 3' impacts objective 22 at another position and does not impact objective aperture 24. The angular difference is selected in such a way that the beam or the transmission signal illuminates the same object point at the target distance of detection space A.

Therefore, it is also possible for LIDAR device 1 to capture light 28 reflected back by illuminated object point 26 at the same angle in its entirety again without a spot cut-off 36 and to deflect it in an axially parallel manner downstream from the optical element 40, which is a μwedge array, in the direction of detector 34.

Figure 11:
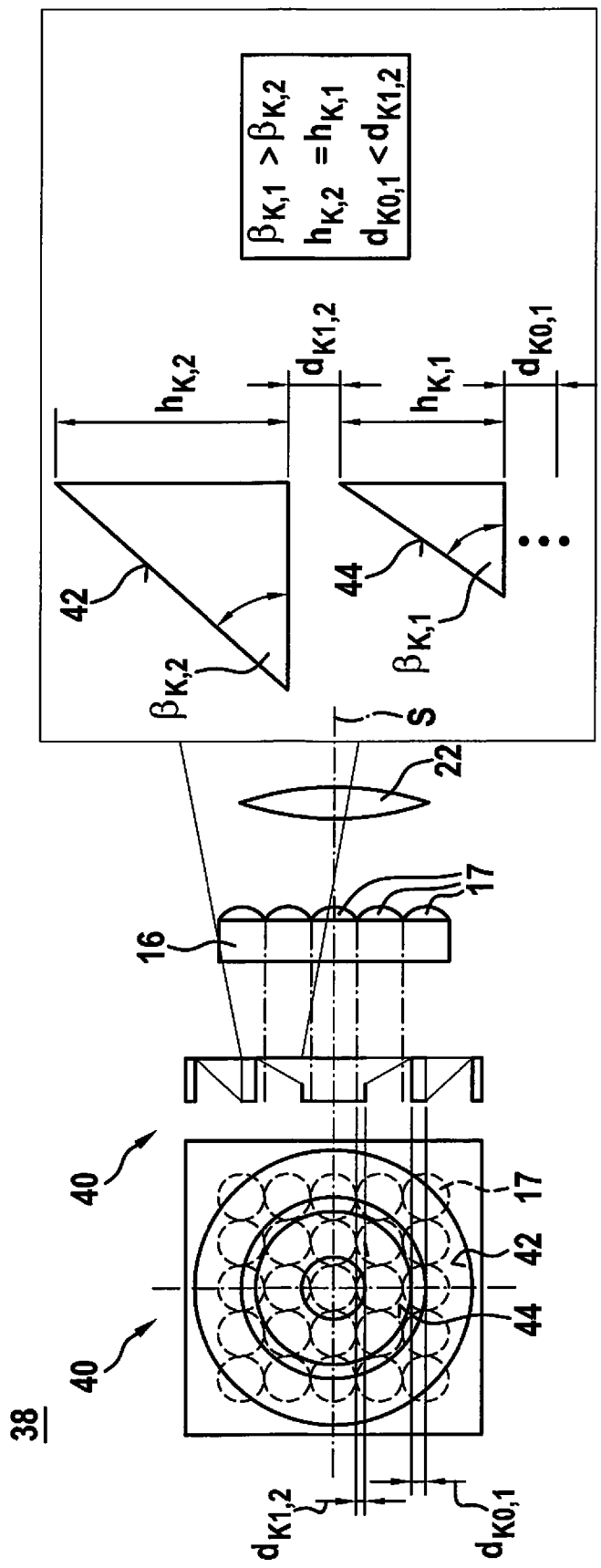
FIG. 11 shows a schematic representation of a wedge array spaced apart from a lens.

FIG. 11 shows a schematic representation of the optical element 40, which is a wedge array, spaced apart from a lens, in a manner analogous to FIG. 9. The height $h_K$ of wedge structures 42, 44 may correspond to the utilized pitch of μlenses 17 and may be constant as compared to FIG. 9. The wedge angles must be adapted due to the incidence angle of signal 3, which becomes steeper depending on the distance from the optical axis. As the distance from optical axis S increases, a radial distance $d_K$ between wedges 42, 44 may also increase. The entire structure is designed radially symmetrically with respect to optical axis S.

What is claimed is:

1. An optical system for a LIDAR device, comprising:
   a lens;
   an objective to deflect beams out of a scanning area or into the scanning area; and
   at least one optical element;
   wherein the lens is a lens array and the objective is situated in a beam path between the scanning area and the lens, and the at least one optical element is situated ahead of the lens in a radiation direction or connected to the lens, the at least one optical element being configured to adjust an incidence direction of radiation onto the lens array.

2. The system as recited in claim 1, wherein the optical element is a diffractive or holographic optical element, which is mounted, on one side, onto the lens or is situated in the beam path of the beams, spaced apart from the lens.

3. The system as recited in claim 1, wherein the optical element is a wedge array including at least one surface pitched obliquely with respect to the radiation direction.

4. The system as recited in claim 3, wherein the optical element is spaced apart from the lens.

5. The system as recited in claim 3, wherein the optical element is connected to the lens in integrally or materially joined fashion.

6. The system as recited in claim 3, wherein the at least one surface of the wedge array is formed rotationally symmetrically about an axis of symmetry.

7. The system as recited in claim 6, wherein the at least one surface of the wedge array is oriented radially away from the axis of symmetry and from the lens.

8. The system as recited in claim 3, wherein the optical element which is the wedge array includes at least two surfaces pitched at an angle in relation to an axis of symmetry, a pitch of the at least two surfaces of the wedge array decreasing as a distance from the axis of symmetry increases.

9. The system as recited in claim 8, wherein a radial distance between the at least two surfaces increases as the distance of the surfaces from the axis of symmetry increases.

10. A LIDAR device for generating beams and for scanning a scanning area with the aid of the beams, comprising:
    a transmitting unit to generate beams and to deflect the beams along the scanning area; and
    a receiver unit including at least one detector configured to receive reflected beams;
    wherein the transmitting unit and/or the receiver unit include an optical system, the optical system including a lens, an objective for deflecting beams out of a scanning area or into the scanning area, and at least one optical element,
    wherein the lens is a lens array and the objective is situated in the beam path between the scanning area and the lens, and the at least one optical element is situated ahead of the lens in a radiation direction or connected to the lens, the at least one optical element being configured to adjust an incidence direction of radiation onto the lens array.

* * * * *